US008355865B2

(12) United States Patent
Wagner et al.

(10) Patent No.: US 8,355,865 B2
(45) Date of Patent: Jan. 15, 2013

(54) TRAVEL TIME INFORMATION SYSTEM

(75) Inventors: Thomas Wagner, Holzwickede (DE); Oliver Wagner, Kappel (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 799 days.

(21) Appl. No.: 11/939,474

(22) Filed: Nov. 13, 2007

(65) Prior Publication Data

US 2008/0162033 A1    Jul. 3, 2008

(30) Foreign Application Priority Data

Nov. 10, 2006    (EP) ..................................... 06023456

(51) Int. Cl.
*G01C 21/26*    (2006.01)
(52) U.S. Cl. ........ 701/465; 701/414; 701/423; 701/425; 701/428; 701/431; 340/995.12; 340/995.13
(58) Field of Classification Search .................. 701/201, 701/204, 209, 211; 340/995.12, 995.13
See application file for complete search history.

(56) References Cited

U.S. PATENT DOCUMENTS

| 6,317,686 | B1 | 11/2001 | Ran |
| 6,438,490 | B2* | 8/2002 | Ohta ............................. 701/210 |
| 6,933,860 | B1* | 8/2005 | Gehman ..................... 340/995.1 |
| 7,376,509 | B2* | 5/2008 | Endo et al. ..................... 701/209 |
| 2005/0096842 | A1* | 5/2005 | Tashiro ......................... 701/210 |
| 2006/0025924 | A1* | 2/2006 | Yoshikawa et al. ........... 701/209 |

FOREIGN PATENT DOCUMENTS

| DE | 10037827 A1 | 8/2000 |
| DE | 102005020152 A1 | 11/2006 |
| EP | 0534755 A2 | 3/1993 |
| EP | 1621851 A2 | 2/2006 |

* cited by examiner

*Primary Examiner* — Thomas Black
*Assistant Examiner* — Peter D Nolan
(74) *Attorney, Agent, or Firm* — O'Shea Getz P.C.

(57) ABSTRACT

A system is provided for providing travel time information for a plurality of positions on an electronic map. The system provides map data including information on road segments, determines a plurality of road segment travel times based on the map data, selects a plurality of positions for which travel time information is to provided, determines a travel time for each of these positions in dependence on the road segment travel times, and displays an optical indicator for the travel times on an electronic map.

24 Claims, 14 Drawing Sheets

TRAVEL TIME INFORMATION SYSTEM

RELATED APPLICATIONS

This application claims priority of European Patent Application Serial Number 06 023 456.4, filed on Nov. 10, 2006, titled METHOD AND DEVICE FOR PROVIDING TRAVEL TIME INFORMATION, which application is incorporated in its entirety by reference in this application.

BACKGROUND

1. Field of the Invention

The invention relates to a system for providing travel time information for a plurality of positions on an electronic map. In particular, the invention relates to methods and devices that allow travel time information to be selectively displaced for positions based on, e.g., selection criteria such as travel times or predefined positions, and which methods and devices may be employed in navigation systems aboard a vehicle.

2. Related Art

While navigation systems in which information is conveyed to a user, such as the driver of a vehicle, using an optical output unit, e.g., a display device, are known in the art, the information conveyed by the optical output unit is frequently fairly limited. Often, the display unit is employed for displaying a digital map in which an active route is highlighted, possibly supplemented by information relating to driving directions. The only piece of information related to travel times that is conventionally included in such digital maps is the total travel time to a destination or the expected time of arrival at the destination.

Travel times are one of the key factors in planning a route or checking the travel progress along a route. Hence, there exists a need in the art for conveying additional information relating to travel times to a user, such as the driver of a vehicle. In particular, there is a need in the art for improved systems for providing travel time information for a plurality of positions on an electronic map. More particularly, there is a need in the art for systems that allow travel time information to be selectively displayed for a plurality of positions that is selected based on specific criteria.

SUMMARY

A system is provided for providing electronic maps displaying travel time information. According to one aspect of the invention, a method for providing travel time information for a plurality of positions on an electronic map is provided. The method includes the steps of (i) providing map data containing information on road segments, (ii) determining a plurality of road segment travel times based on the map data, (iii) selecting a plurality of positions for which travel time information is to be provided, and, for each of the positions, determining a travel time in dependence on at least one road segment travel time of a road segment located in proximity to the respective position and (iv) displaying an optical indicator for the respective travel time on the electronic map. The method may be executed in the form of a computer program that includes logic that, when executed by a processor of a navigation system, performs the method of the invention.

According to another aspect of the invention, a device is provided for generating travel time information on an electronic map. The device includes a storage unit that stores map data, including information on road segments, a processor unit that determines a plurality of road segment travel times and a display unit coupled to a processor unit and configured to display an optical indicator for a travel time of each of the plurality of positions on an electronic map. The processor unit is further configured to select a plurality of positions for which travel time information is to be provided and to determine, for each of the positions, a travel time in dependence on at least one road segment travel time of a road segment located in proximity to the respective position. The device allows additional information related to travel times to be incorporated into the electronic map, where the travel times for the plurality of positions are determined in dependence on information that is readily available in navigation systems, namely the road segment travel times, with only little additional computational effort being required. Further, since the plurality of positions is selected by the processor unit, the electronic map may be prevented from becoming cramped and may still be easily read.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
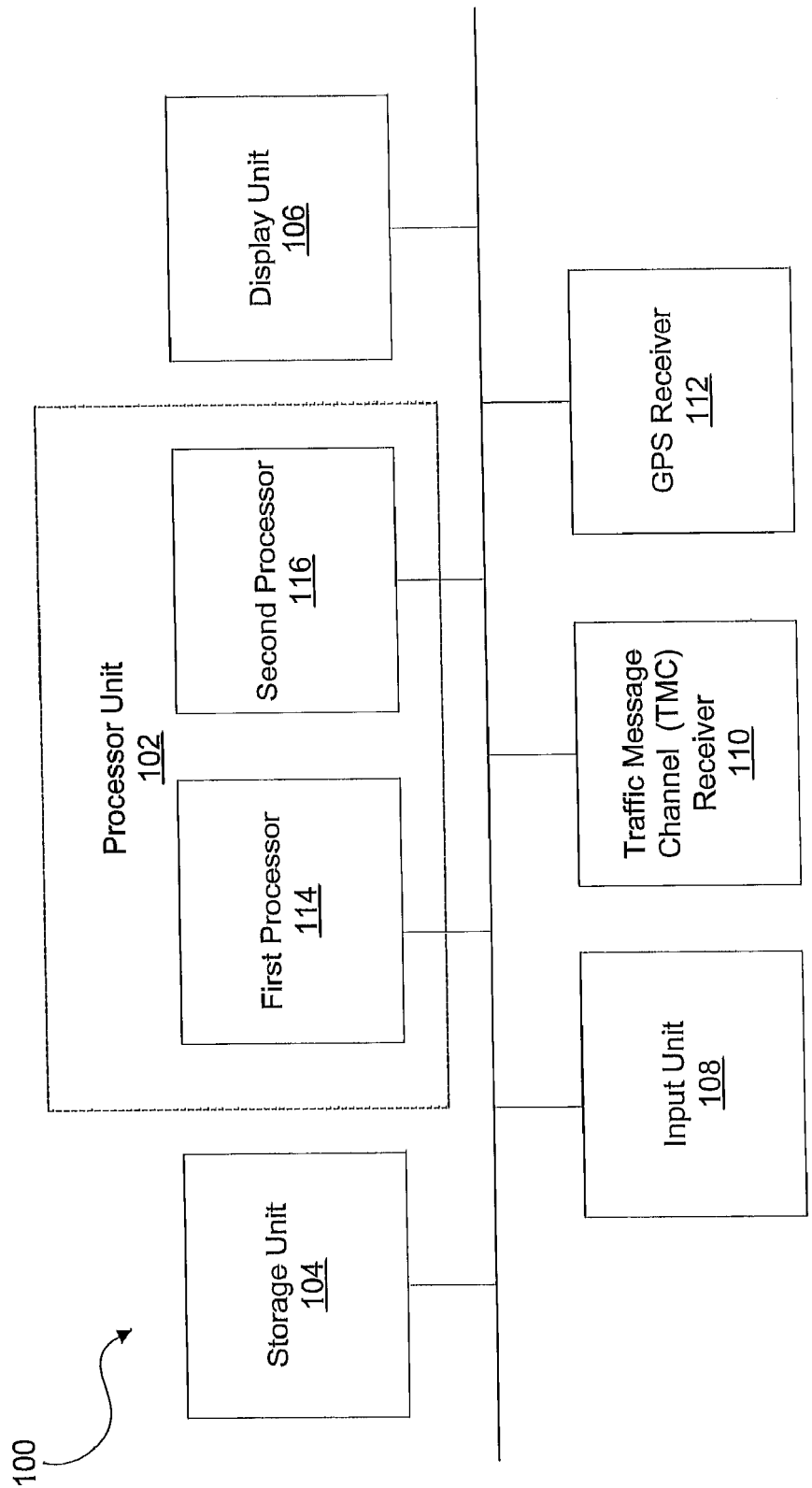
FIG. 1 illustrates one example of an implementation of a schematic block diagram of a device for providing travel time information.

FIGS. 1-9 illustrate various examples of implementations of a system for providing travel time information. In particular, FIG. 1 illustrates one example of an implementation of a schematic block diagram of a device 100 for providing travel time information for a plurality of positions. The device 100 may include a processor unit 102, a storage unit 104, a display unit 106, an input unit 108, a traffic message channel (TMC)-receiver 110, and a GPS-receiver 112. All components are interconnected via a common bus.

Figure 2:
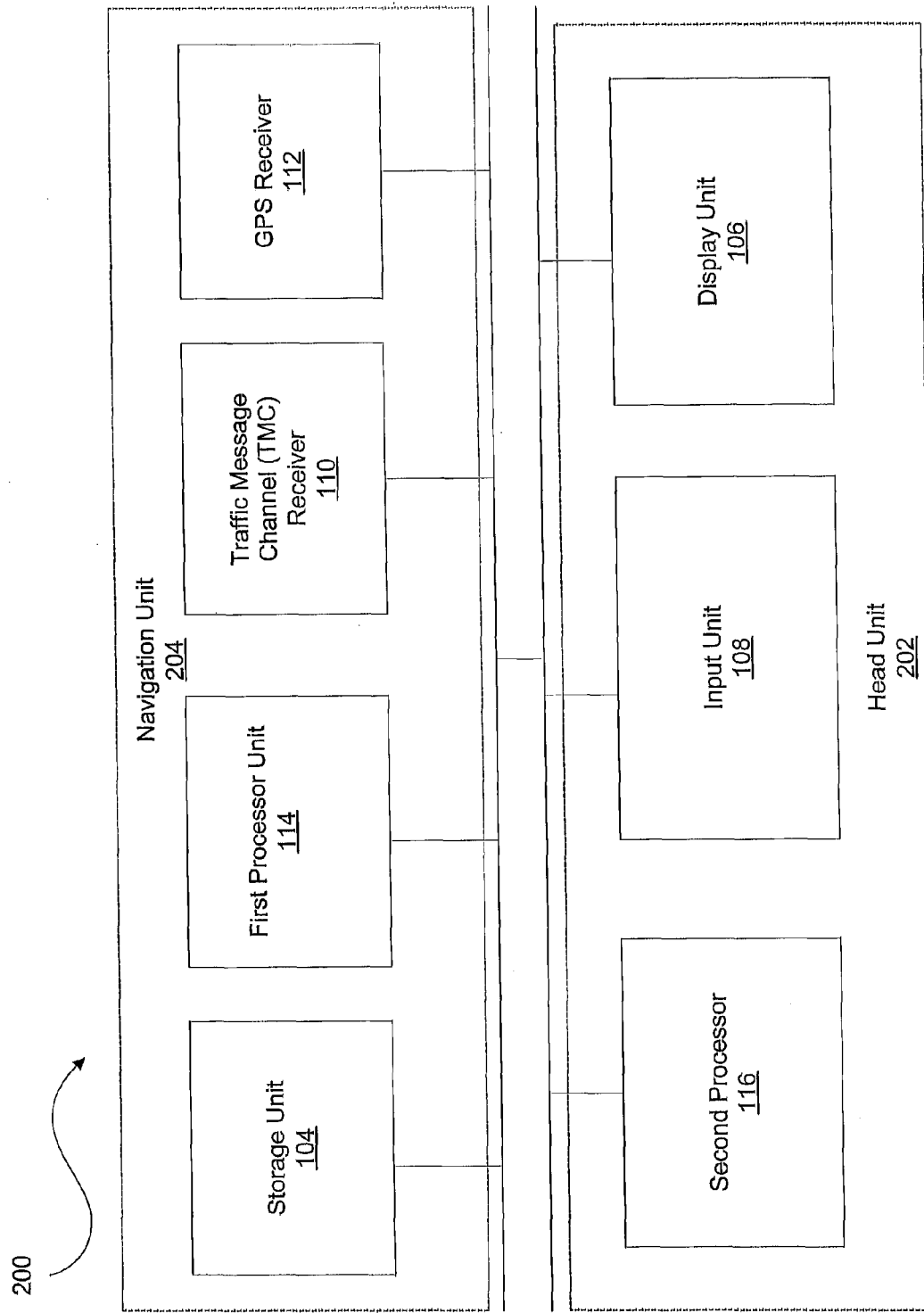
FIG. 2 illustrates another example of an implementation of schematic block diagram of a device for providing travel time information.

The processor unit 102 performs two main functions, namely, (i) performing optimum route searches and (ii) selecting positions for which travel time information is to be displayed and determining the respective travel times for the selected positions. In the example illustrated in FIG. 1, the processor unit 102 includes a first processor 114 and a second processor 116 for performing these two different functions. For example, the first processor 114 may be configured for optimum route searches and the second processor 116 may be configured for selecting the plurality of positions for which travel time information is to be displayed and for determining the respective travel times. While the first processor 114 and the second processor 116 are shown as separate entities in the block diagram of FIG. 1, it is to be understood that the two functions of the processor unit 102 may also be performed by a single processor or by more than two processors. In the case in which there are two different processors 114 and 116 for performing optimum route searches and selecting the plurality of positions for which travel time information is to be displayed, respectively, the first processor 114 and the second processor 116 may also be integrated with other components of the system. For example, as illustrated in FIG. 2, which is another example block diagram of the device 200 illustrated in FIG. 1 providing travel time information for a plurality of positions, the second processor 116 may be integrated with the display unit 106 so as to form a "head unit" 202 of the device 100, while all other components may be integrated with one another component or component to form a "navigation unit" 204 of the device 100. The input unit 108 may form part of the either the head unit 202 or the navigation unit 204. In this case, the head unit 202, which generally speaking performs the function of displaying an electronic map and associated information, and the navigation unit 204, which performs the function of determining routes, may be interconnected via any suitable bus, such as a MOST bus or a Bluetooth bus. The navigation unit and the head unit may together form what is commonly referred to as the "navigation system."

The storage unit 104 may be, e.g., a hard disk, a CD ROM, a DVD, a flash type memory or any other suitable memory that has, stored on the storage unit 104, map data that includes information on a road networks and that include a plurality of road segments. The map data stored by the storage unit 104 may include all information that is conventionally employed in navigation systems, such as the locations of a start point and an end point of each road segment, a characteristic travel speed on the road segment or, equivalently, a rank attribute that quantifies the characteristic travel speed, possibly supplemented by other information such as the length of the road segment.

The display unit 106 may be any suitable optical output unit, such as a screen display or an optical projector. The display unit 106 may include the function of a map viewer, i.e., it may be configured to generate an electronic map based on map data stored in the storage unit 104.

The input unit 108, the TMC-receiver 110 and the GPS-receiver 112 may have any configuration that is known from conventional navigation systems. For example, the input unit 108 may be designed as a touch sensitive screen, which may be integrated with the display unit 106.

As will be described more fully below, after input of a start point and, possibly, a destination, the first processor 114 performs an optimum route search based on the map data stored by the storage unit 104. As result of the optimum route search, the first processor 114 determines a set of road segments established by the route starting at the start point. For each road segment established by the route, the traversal time may either be explicitly stored in the map data on the storage unit 104 or may be readily derived from the map data, e.g., in a case in which the map data provides information on the total length of the road segment as well as the average travel speed. Similarly, the total travel time from the route start point to points on the respective road segments of the route, such as the end point of the road segment, may be readily derived by simply adding up traversal times for road segments. The corresponding travel time from the route start point to a point on the road segment will be referred to as "road segment travel time". Accordingly, the road segment travel times that are readily available are harnessed to incorporate travel time information for a plurality of positions on an electronic map, thereby enabling this information to be conveyed to a user.

For this purpose, the second processor 116 selects the plurality of positions for which travel time information is to be displayed and determines the respective travel times in dependence on the road segment travel times. For a position of the plurality of positions, the corresponding travel time is then displayed on the electronic map generated by the display unit 106. The selecting of the plurality of positions for which travel time information is to be displayed as well as the manner in which the corresponding travel time is displayed may be performed in various ways, as will be explained in more detail below.

Figure 3A:
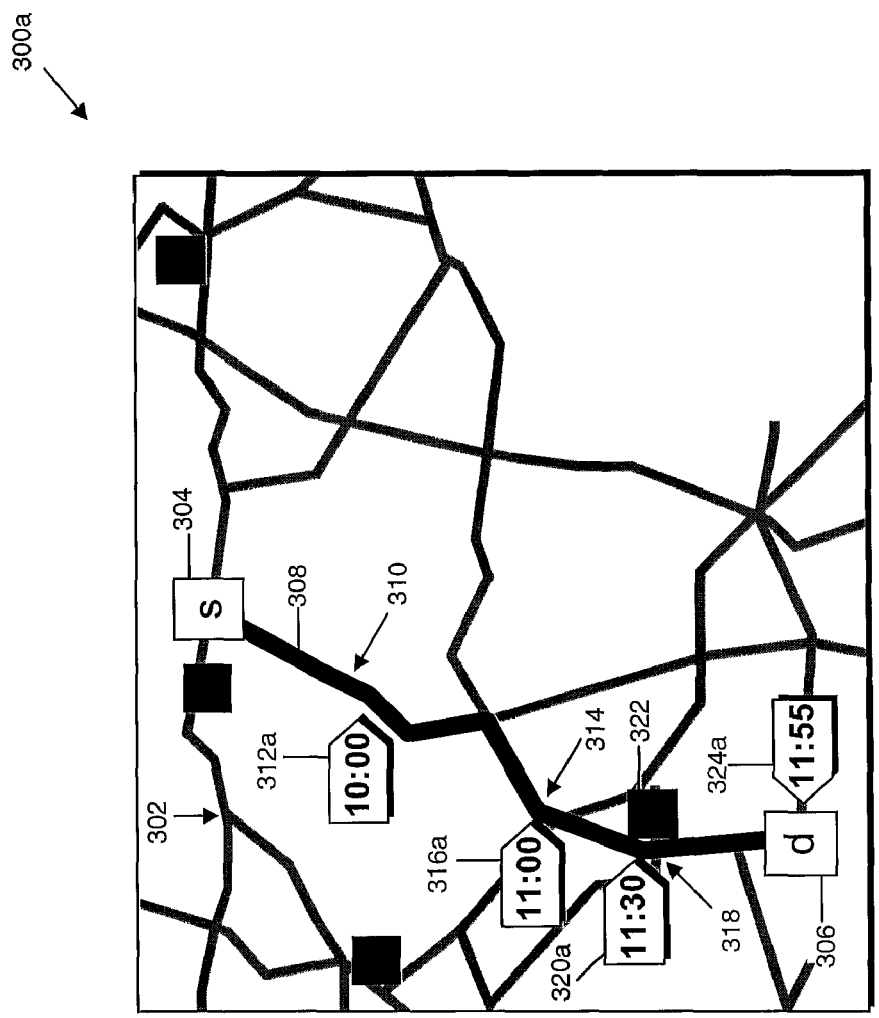
FIG. 3A illustrates one example of an electronic map showing travel time information via optical indicators.
Figure 3B:
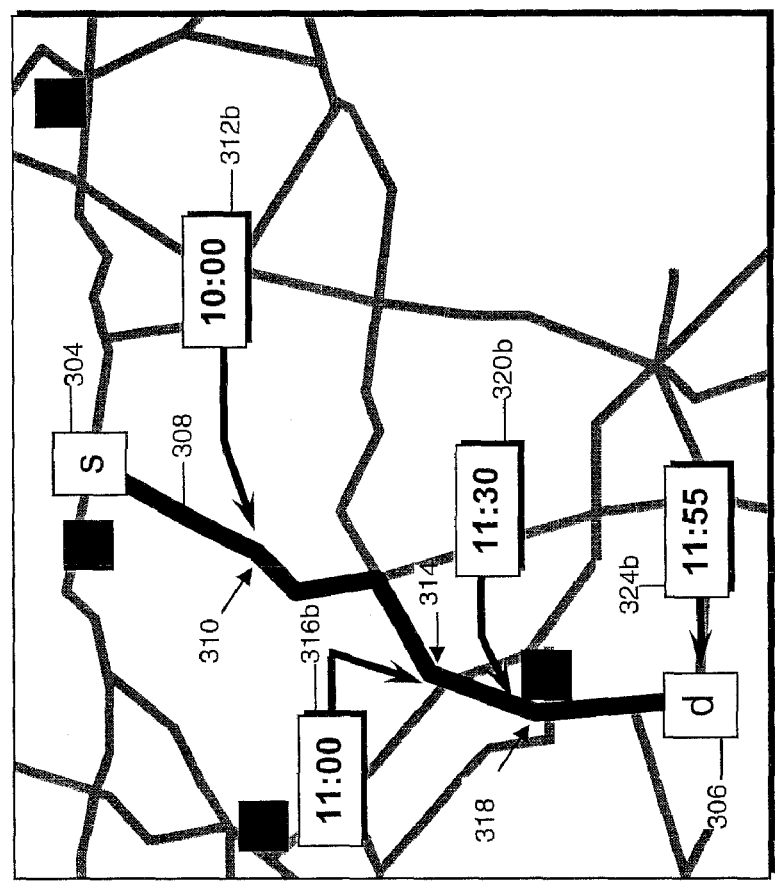
FIG. 3B illustrates another example of an electronic map showing travel time information via optical indicators.
Figure 3C:
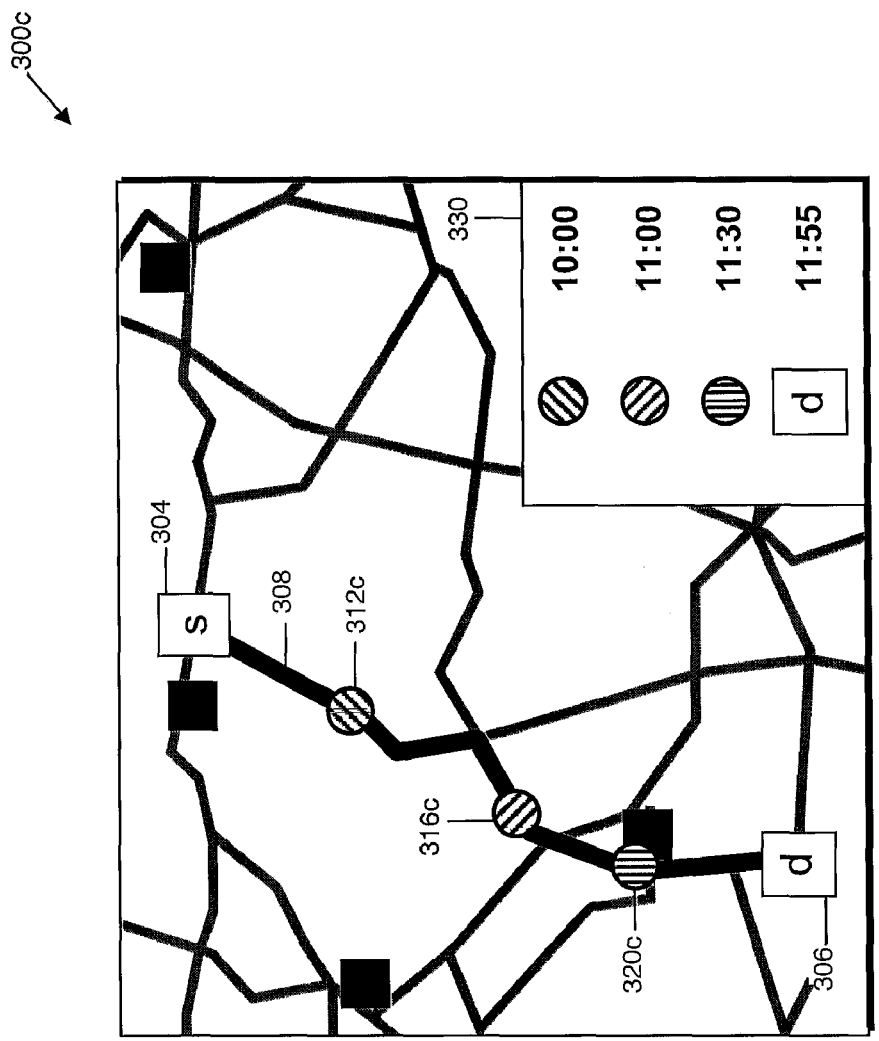
FIG. 3C illustrates yet another example of an electronic map showing travel time information via optical indicators.
Figure 4:
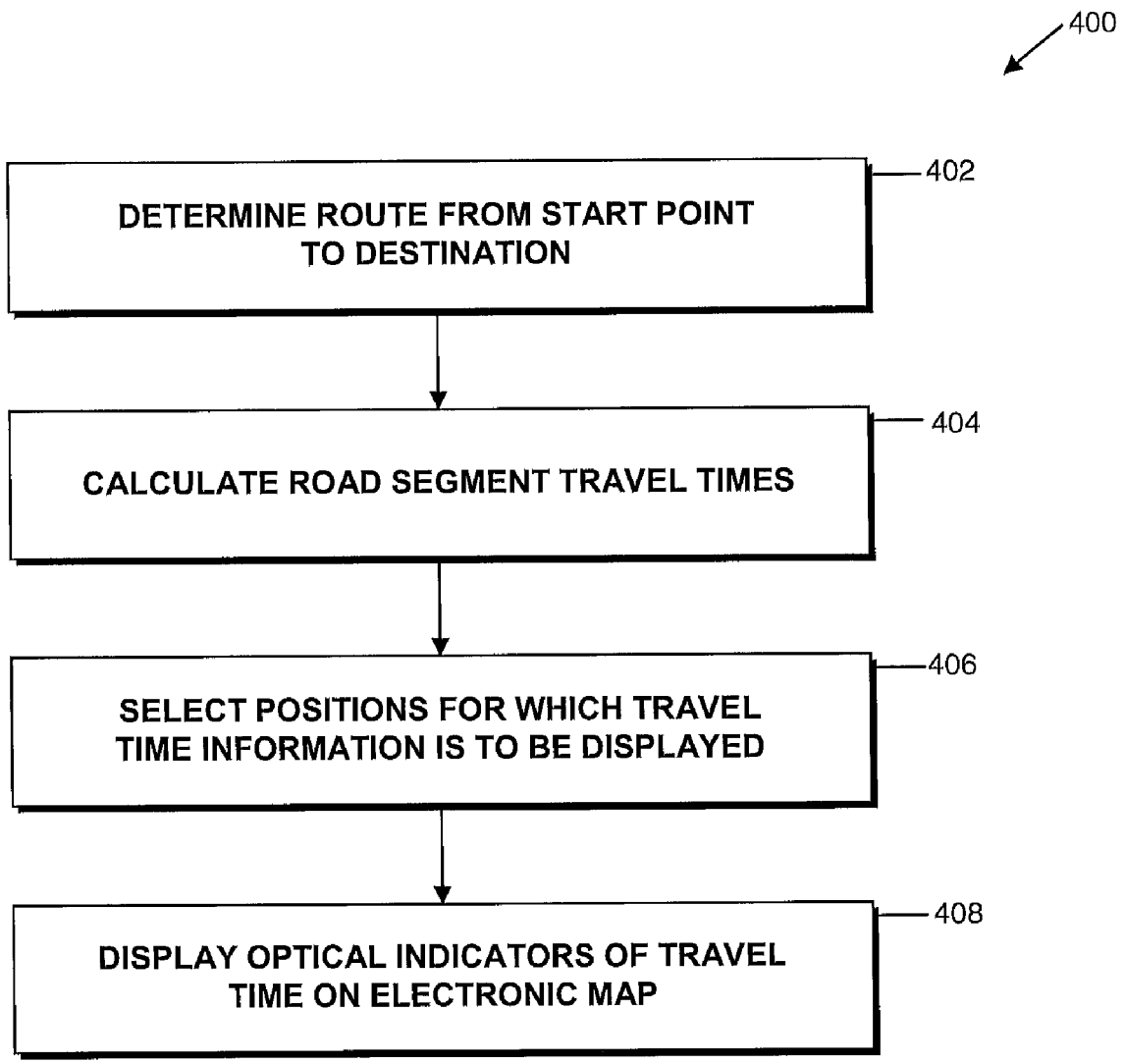
FIG. 4 is a flow chart representing one example of a method for generating electronic maps illustrating travel time information.
Figure 5:
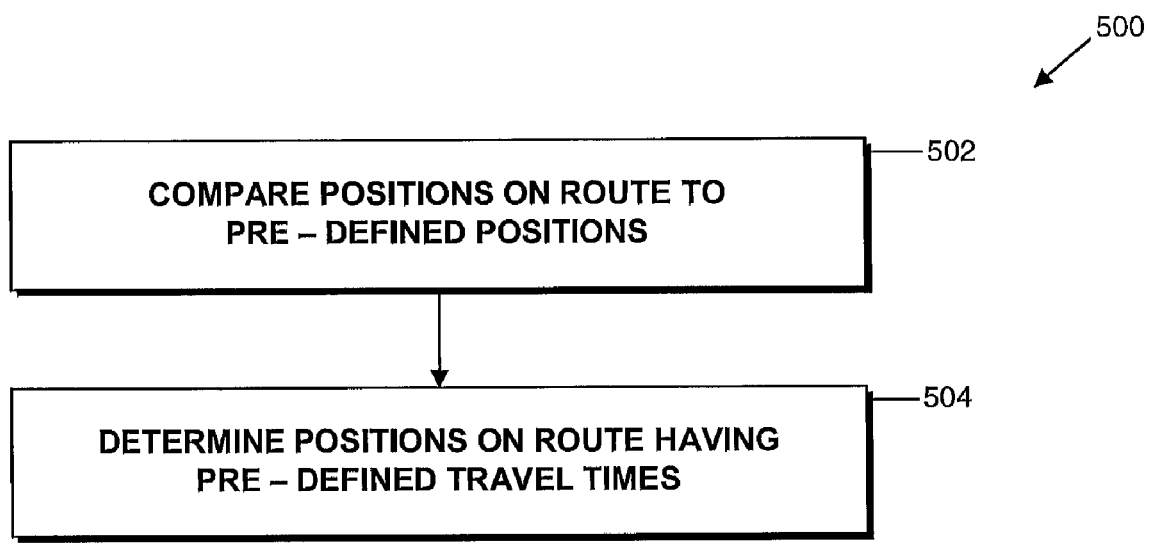
FIG. 5 is a flow chart representing an example of a subroutine of the method of FIG. 4.

With reference to FIGS. 3-5, a method of providing travel time information for a plurality of positions according to one example of an implementation of a system is described. The method may be, for example, performed by the devices 100 or 200 of FIG. 1 and FIG. 2, respectively.

By way of example, FIG. 3A illustrates an electronic map 300a displayed by the display unit 106. The electronic map 300a includes a road network 302. A route 308 is illustrated connecting a start point 304 and a destination 306 that corresponds, for example, to a fastest route or a shortest route determined by the first processor 114. In addition to an optical indicator 324a of a total travel time from start point 304 to destination 306, the electronic map includes additional optical indicators 312a, 316a and 320a indicative of travel times for a plurality of positions 310, 314 and 318, respectively, along the route 308. The optical indicators 312a, 316a and 320a are displayed proximal to the corresponding positions 310, 314 and 318, respectively, along the route. In the example shown, the optical indicators 312a, 316a and 320a are arrows pointing towards the respective position on the route 308 and inscribed by an alphanumerical string representing the travel time. Of course, the optical indicators are not restricted to this specific form shown in FIG. 3A, but may have arbitrary other forms, as illustrated, for example, in FIGS. 3A & 3B.

For example, FIG. 3B illustrates another example of the electronic map display 300b, which is substantially similar to the electronic map display 300a. However, the electronic map display 300b illustrates alternative optical indicators 312b, 316b, 320b and 324b. In the example, the optical indicators 312b, 316b, 320b and 324b are such that the alphanumerical strings representing the associated travel times are not displayed directly in proximity to the route 308, but are associated with the respective positions on the route 308 by arrows.

Similarly, FIG. 3C illustrates another example of the electronic map display 300c, which is substantially similar to the electronic map displays 300a and 300b of FIGS. 3A and 3B. In the example of the electronic map display 300c shown in FIG. 3C, the optical indicators 312c, 316c and 320c are symbols displayed directly on the route 308. A legend 330 is included into the electronic map 300b providing the corresponding information on travel times.

In the examples illustrated in FIGS. 3A, 3B and 3C, the positions 310, 314 and 318 for which travel time information is displayed are selected by comparing positions along the route 308 to a set of predefined positions, as well as by comparing the road segment travel times to predefined times. More specifically, position 318 corresponds to a position close to a city schematically indicated at 322. Positions such as position 318 for which travel time information is to be displayed by virtue of their proximity to a location of interest, may be conveniently defined by the map data stored in storage unit 104. Positions 310 and 314 are selected based on their travel times, namely full hours. To select positions 310 and 314, the road segment travel times are compared to predefined times—such as full hours—and based on the result of the comparison, the corresponding positions 310 and 314 are identified. The positions 310 and 314 may, for example, be set equal to an end point of a road segment that has a road segment travel time closest to one of the predefined times. Alternatively, the positions 310 and 314 may be more accurately determined by interpolating between road segment travel times. Assuming, e.g., that the road segment travel times correspond to the travel times form the start point 304 to end points of the respective road segments, the position is identified to be located on the road segment that has a road segment travel time later than one of the predefined times, but the road segment travel time corresponding to the preceding road segment along the route being earlier than the predefined time.

FIG. 4 is a flow chart representing one method that may be employed for generating an electronic map including travel time information for a plurality of positions, such as the ones shown in FIGS. 3A, 3B and 3C. The method is generally indicated at 400. At step 402, a route from the start point to the destination is determined. At step 404, the road segment travel times for road segments located on the route are calculated. As has already been indicated above, the road segment travel times may either already be explicitly known in optimum route determination, or may be readily computed by a simple summing operation. At step 406, the positions for which travel time information is to be displayed are selected. Finally, at step 408, optical indicators of the travel time for the plurality of positions are displayed on the electronic map.

FIG. 5 is a flow chart representing one example of a subroutine 500 that may be employed for implementing step 406 of method 400 of FIG. 4. As explained above, the selection of the positions for which travel time information is to be displayed may include the comparison of positions on the route to predefined positions at step 502 in combination with the determination of positions on the route by comparison of road segment travel times to predefined times at step 504. While in this example subroutine of FIG. 5 as well as the example electronic maps 300a, 300b and 300c of FIGS. 3A, 3B and 3C both a comparison of positions on the route to predefined positions and a comparison of road segment travel times to predefined travel times is performed to identify the plurality of positions for which travel time information is to be displayed. It is to be understood that the plurality of positions may also be selected based on either one of these criteria only.

It will also be appreciated that, while the example electronic maps 300a, 300b and 300c of FIGS. 3A, 3B and 3C simultaneously display a plurality of optical indicators 312a, 312b, 312c, 316a, 316b, 316c, 320a, 320b, 320c, 324a and 324b indicative of the respective travel times, the optical indicators may also be displayed sequentially, i.e., at a given time, not more than one optical indicator has to be present on the electronic map, as will be explained below with reference to FIGS. 6A, 6B and 7.

Figure 6A:
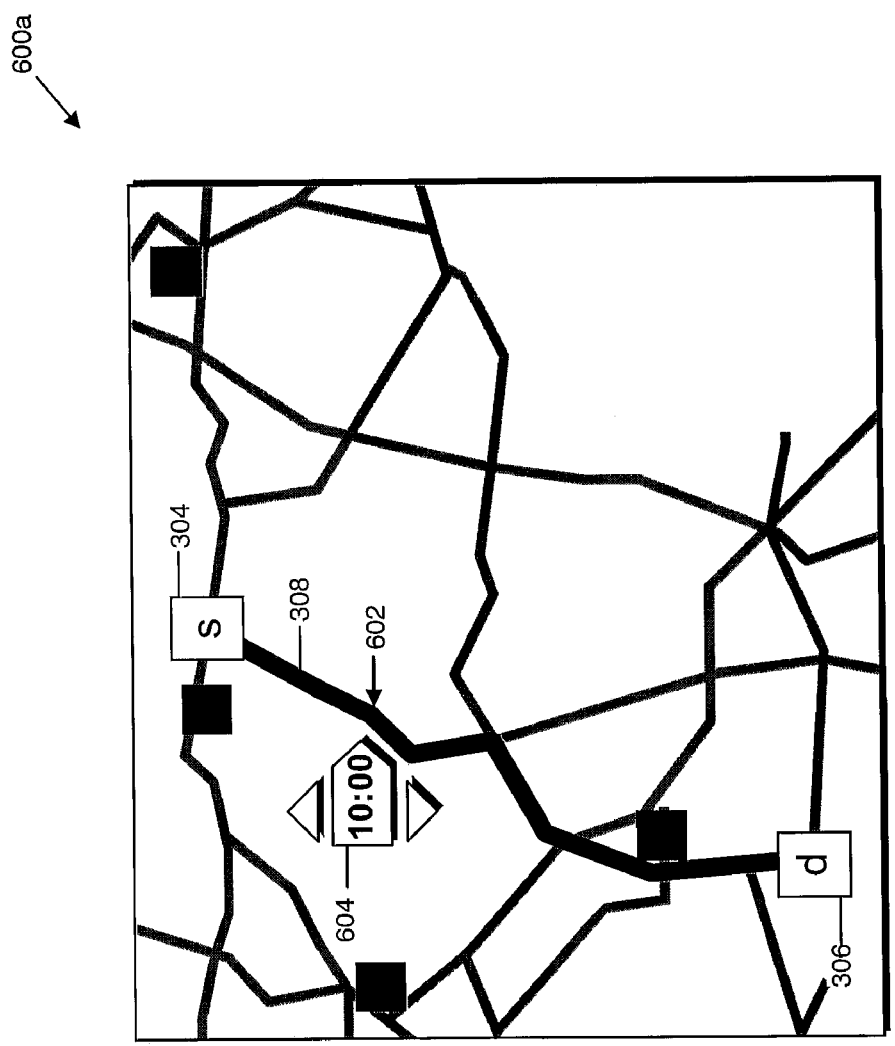
FIG. 6A illustrates an example of an electronic map showing an optical travel time information indicator generated based upon user input.
Figure 6B:
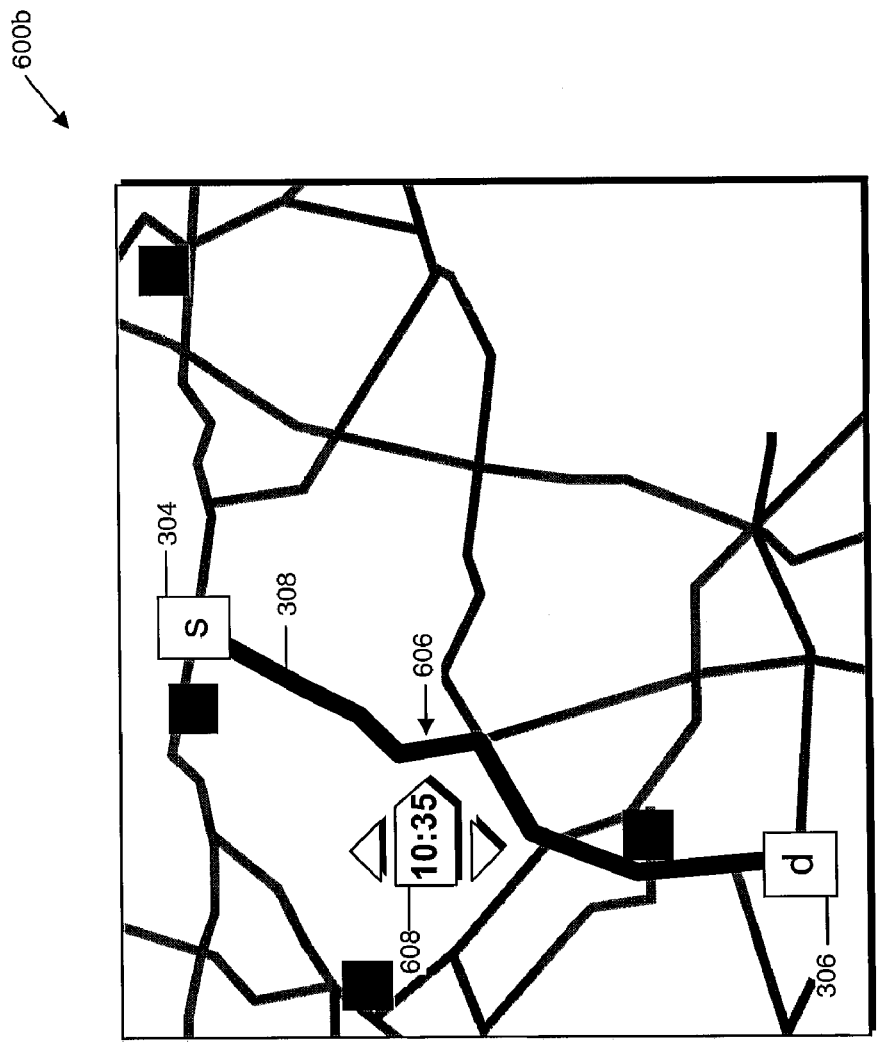
FIG. 6B illustrates another example of an electronic map showing an optical travel time information indicator generated based upon user input.

FIGS. 6A and 6B show an example electronic map 600a and 600b at different times, displaying different travel time information based on different user input. The road network as well as the route 308 is identical to the one illustrated in FIGS. 3A, 3B and 3C above. Contrary to the previously explained implementation, however, travel time information is provided for a selected position based on a user input. In FIG. 6A, an optical indicator 604 is indicative of a travel time for position 602 selected by a user input, while in FIG. 6B an optical indicator 608 is indicative of a travel time associated with position 606 that is also selected by a user input. The position for which travel time information is to be displayed may be shifted along the route 308 by the user input, for example, by the user pressing one of two buttons shifting the optical indicator 604 and 608 and the corresponding position for which travel time information is to be displayed 604 and 606 upward or downward along the route 308, or in case a touch-sensitive screen, is employed by a user pressing a position located somewhere along the route 308. It will be appreciated that, while only a single optical indicator 604 or 608 is present in the electronic map 600a, 600b, respectively, shown in FIGS. 6A & 6B, travel time information is still provided for a plurality of positions albeit in a sequential manner.

The determination of the travel time associated with a position selected by the user input may again be performed by setting the travel time equal to a road segment travel time of a road segment on which the position is located, or by interpolating between different road segment travel times. In either case, the determination of the travel time associated with the position selected by the user input may be performed using map coordinates and does not require the position to be transformed to world coordinates.

Figure 7:
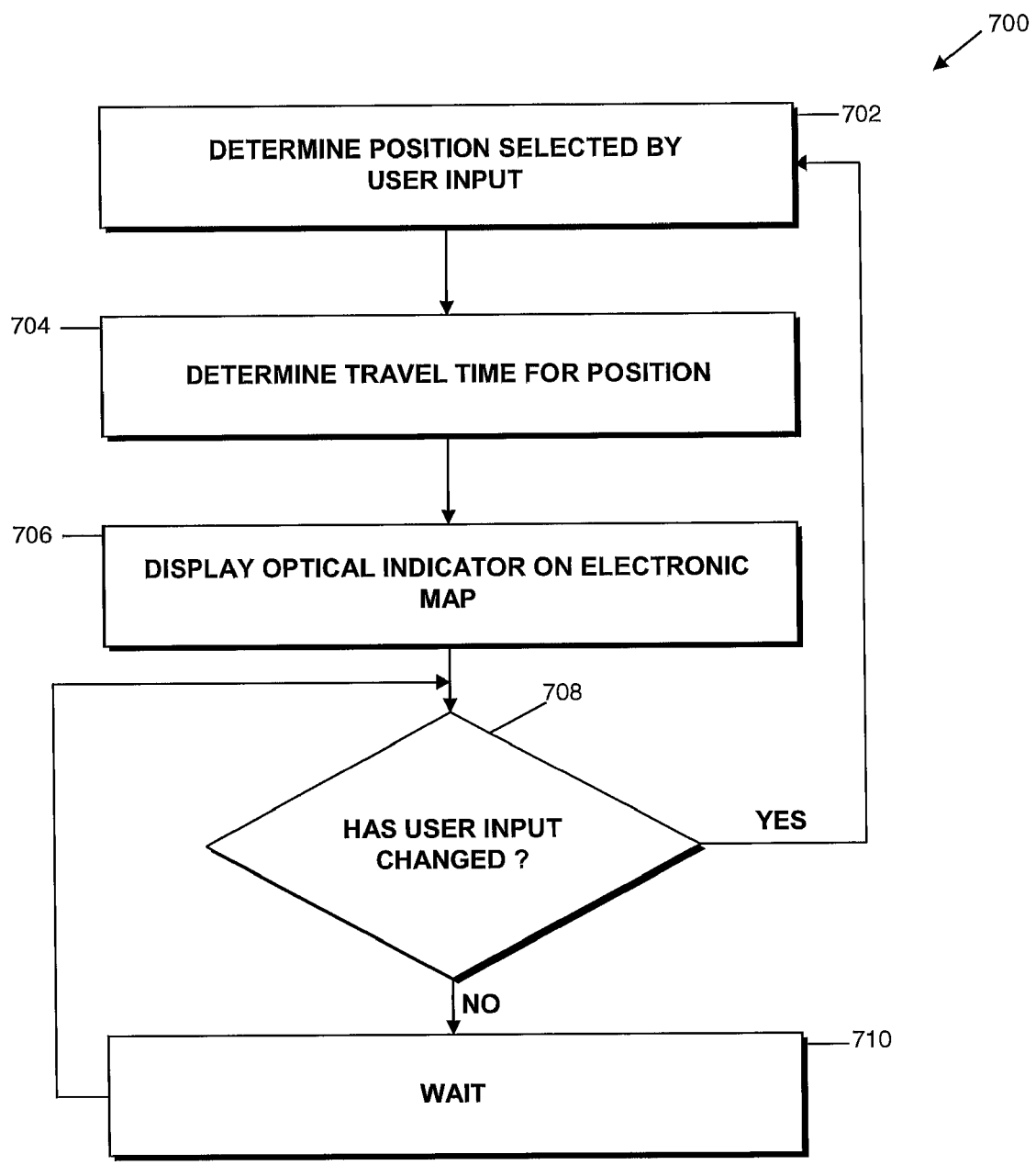
FIG. 7 is a flow chart representing an example of another method for generating electronic maps illustrating travel time information.

FIG. 7 is a flow chart representing a method of providing travel time information that may be employed for generating the electronic maps shown in FIGS. 6A and 6B. The method is generally indicated at 700. At step 702, a position selected by a user input is determined. At step 704, the travel time for the position selected by the user input is determined, e.g., by setting the travel time equal to a road segment travel time of a road segment in proximity to the position or by interpolating between road segment travel times. At step 706, an optical indicator for the travel time associated with the position selected by the user input is displayed on the electronic map. At steps 708 and 710, the user input is monitored. If it is determined that the user input has changed, steps 702-706 are repeated for the new position selected by the new user input.

Naturally, many modifications of the methods explained with reference to FIGS. 3-7 above are conceivable. For example, while in the examples provided the electronic maps shown in FIGS. 3A, 3B, 3C, 6A and 6B the optical indicators for the travel times include an alphanumerical string representing a time of the day, the travel times may also be defined as time elapsed since the beginning of the travel.

Further, the examples of FIGS. 3A, 3B, 3C and 4 and the examples of FIGS. 5A, 5B and 6 may be readily intercombined. For example, travel time information may be displayed on the electronic map both for a number of positions selected by comparison with predefined positions or predefined travel times, and for a position selected by a user input.

Further, dynamic route determination may be readily incorporated into all methods explained above. For example, if the TMC-Receiver 110 of the navigation device, for example of the devices 100, 200 of FIGS. 1 & 2, receive a signal indicating that a traffic jam or other obstruction reduces an allowed travel speed on a road segment traversed by the route, the road segment travel times, the plurality of positions for which travel time information is to be provided, and the corresponding travel times may be updated according to the received TMC-signal. The optical indicators may be correspondingly redisplayed on the electronic map.

Still further, the travel progress may be monitored and the optical indicators for travel times may be updated in dependence on the monitored travel progress. For this purpose, the current vehicle position may be determined by the GPS-receiver 112 of the navigation device, for example of the devices 100, 200 of FIGS. 1 & 2, and a current time may be compared to the road segment travel time of the road segment on which the vehicle is currently located. If the current time and this road segment travel time—i.e., the expected time of arrival at the road segment—differ by a predetermined amount, the optical indicators for the plurality of positions may be correspondingly updated.

The incorporation of additional travel time information is not only useful in the case in which there is an active route from a start point to a destination, but may have useful applications in other cases as well. One such alternative scenario in which the incorporation of travel time information for a plurality of positions is useful will next be explained with reference to FIGS. 8A, 8B, 9 and 10.

Figure 8A:
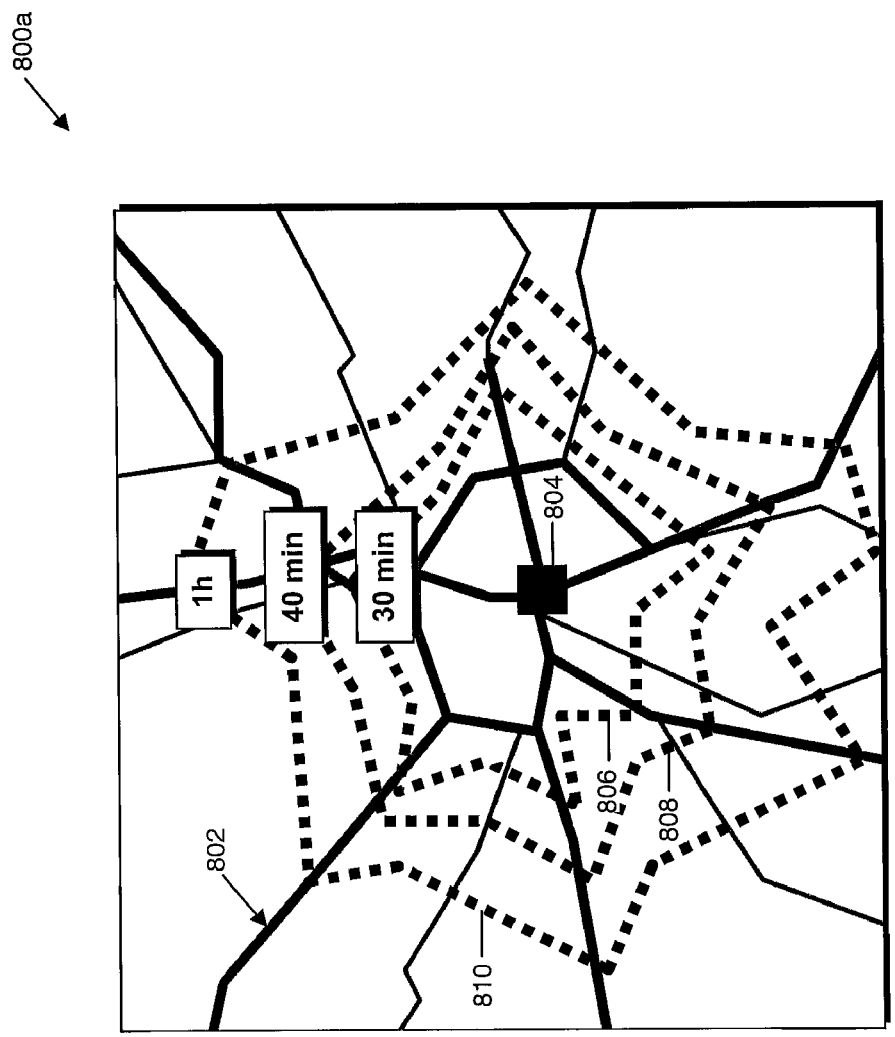
FIG. 8A illustrates another example of an electronic map showing travel time information.
Figure 8B:
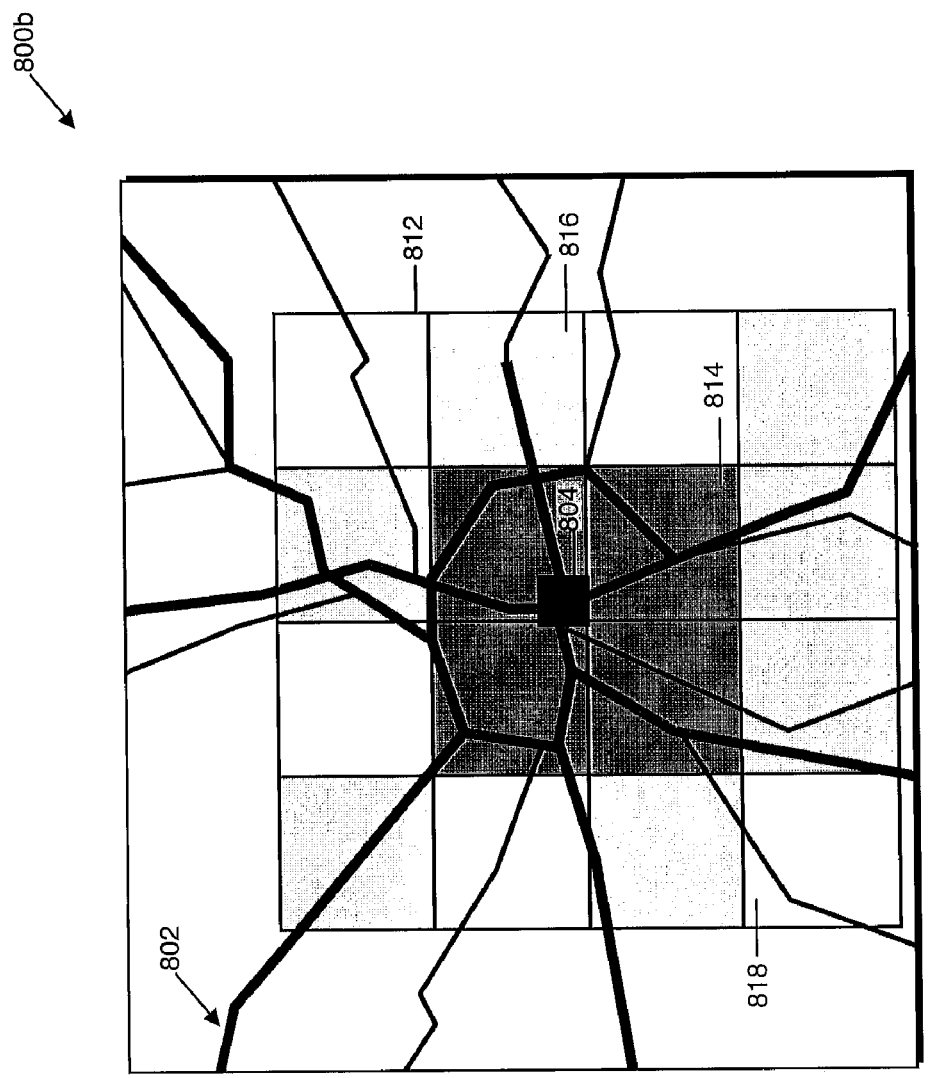
FIG. 8B illustrates yet another example of an electronic map showing travel time information.

FIGS. 8A and 8B show examples of electronic maps in which optical indications, in the form of lines and surface patterns, respectively, are incorporated to indicate areas on the electronic map that may be reached within a given time. The electronic maps 800a and 800b of FIGS. 8A and 8B, respectively, include a road network 802 and a start point 804 from which travel times are to be calculated. Roads having different travel speeds are schematically indicated as solid lines having different thickness. In FIG. 8A, points on various road segments that may be reached within predefined times, such as 30 minutes, 40 minutes and one hour, are determined and are interconnected by lines 806, 808 and 810, respectively. The dotted lines 806, 808 and 810 represent zone boundaries of zones that may be reached within the travel times of 30 minutes, 40 minutes and one hour, respectively, similar to isobaric lines on a weather map. Naturally, the lines 806, 808 and 810 may be supplemented by a surface pattern filling the area enclosed by the respective lines.

As shown in FIG. 8B, information on travel times for a plurality of points may also be provided in the form of surface patterns only. In the electronic map 800b of FIG. 8B, a tiling 812 is defined so as to cover an area surrounding the start point 804. For each tile of the tiling, a characteristic travel time from the start point 804 to a position located inside the tile is calculated using an optimum route search. Depending on the travel time thus determined for a tile of the tiling, the tile is filled with one of a plurality of surface patterns or colors 814, 816 and 818 that represent the associated travel time.

While no tiling is shown in FIG. 8A, the computation of the lines 806, 808 and 810 or their respective corner points is advantageously also based on the definition of a tiling. In this case, only one optimum route search has to be performed for each of the tiles, thereby limiting the computational power necessary to compute the lines 806, 808 and 810.

Figure 9:
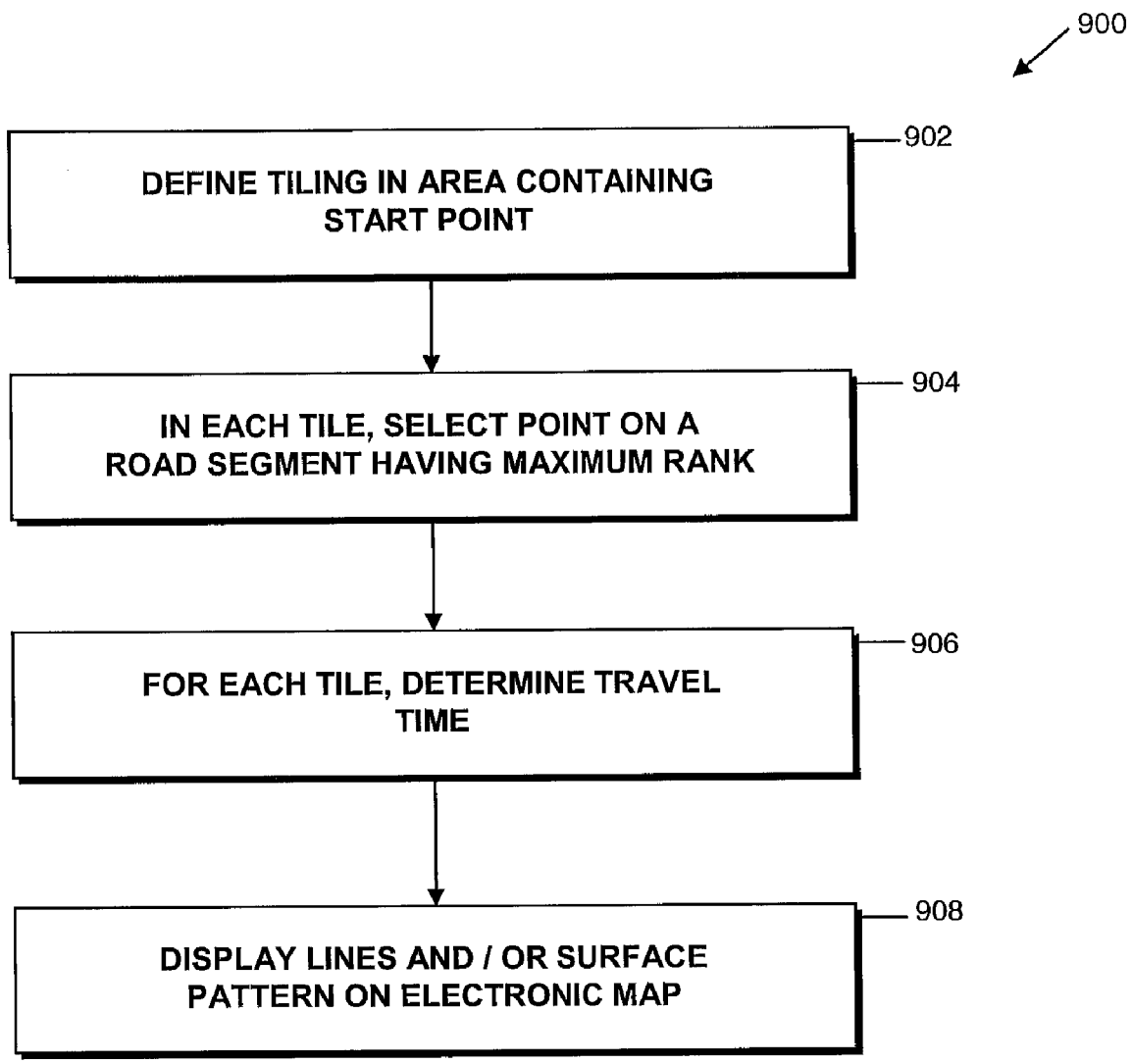
FIG. 9 is a flow chart representing another method for generating the electronic maps showing travel time information.

FIG. 9 is a flow chart representing on example of a method of providing travel time information according to another implementation of the invention. More specifically, the method of FIG. 9 allows travel time information in the form of lines or surface patterns to be generated, as indicated in the example electronic maps 800a, 800b of FIGS. 8A and 8B. The method is generally indicated at 900. At step 902, a tiling is defined in an area containing the start point. At step 904, for each tile of the tiling, a point is selected that is located on a road segment in the tile having maximum rank or maximum travel speed within the tile. At step 906, for each tile of the tiling, a travel time from the start point to the thus determined point in the tile is determined. At step 908, optical indicators of the travel time are displayed in the form of lines and/or surface patterns on the electronic map, which lines and/or surface patterns are indicative of zone boundaries or zones, respectively, that may be reached within a given travel time. If lines are displayed, the corner points of the lines may be determined in various ways. In simple case, the corner point may be set equal to the intersection of a road segment with a tile boundary or may be set equal to a road segment vertex. Alternatively or additionally, the position of the corner points of the lines may be determined based on an interpolation between different road segment vertices.

Figure 10:
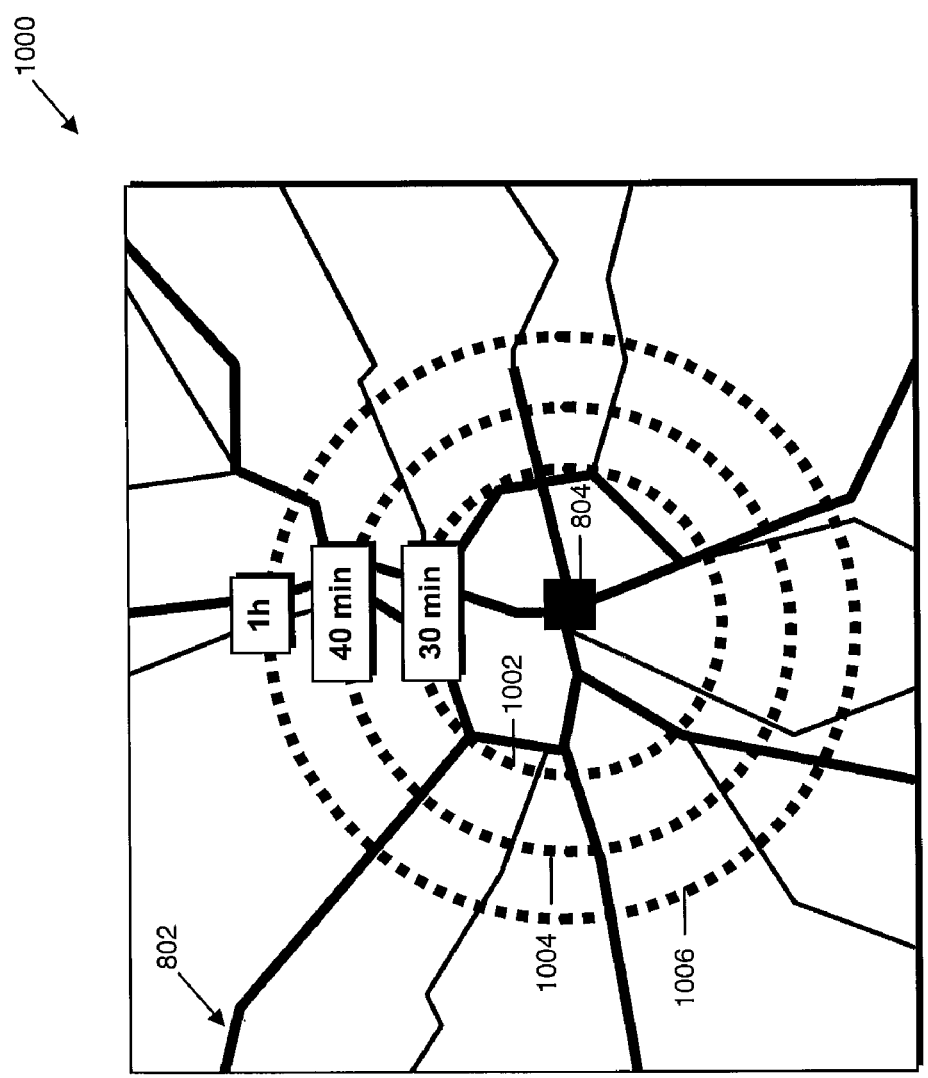
FIG. 10 illustrates an electronic map showing travel time information generated by a method according to another example of an implementation of the invention.

Naturally, simplified versions of the method of FIG. 9 are also conceivable. For example, rather than determining the exact travel times based on optimum route searches for tiles of a tiling, the regions that may be reached within a given travel time may approximately also be determined by assuming a homogenous, average travel time in all directions. Then, the lines indicative of zone boundaries of zones that can be reached within a given travel time are represented by concentric circles. For example, an electronic map 1000 of FIG. 10 is provided in which dotted lines 1002, 1004 and 1006 represent the approximate zone boundaries of zones that can be reached within 30 minutes, 40 minutes and one hour travel time. While having a reduced accuracy in comparison to the electronic maps shown in FIGS. 8A and 8B, the generation of the electronic map 1000 of FIG. 10 requires less computational power.

As is evident from the above, the invention provides a system, including methods and devices, that allows travel time information for a plurality of positions to be incorporated into an electronic map. The incorporation of the travel time information for a plurality of positions facilitates route planning for a user or allows the user to verify that travel progress is as scheduled. According to the various examples of implementations, the travel time information for the plurality of positions is determined based on road segment travel times that are readily available in navigation systems. Further, the positions for which travel time information is to be displayed may be selected according to a wide variety of criteria, so that the methods and devices according to the various implementations may be easily adapted to user preferences.

In summary, the devices and methods described above provide, in one example of an implementation, road segment travel times for road segments that corresponds to, or allows one to derive a travel time from, a start point to an arbitrary point on the respective road segment, such as an end point of the road segment or an arbitrary vertex of the road segment. It is recognized, however, that the road segment travel time for a road segment does not necessarily have to be provided in the form of a single number that directly reflects the total travel time from the start point to the point on the road segment, but may be any suitable information that allows this travel time to be determined. For example, road segment travel times may have the form of data that specify the time required for traversing the individual road segments traversed by the route from the start point, rather than an accrued travel time. It should be noted that this information, i.e., the plurality of road segment travel times, is generally readily available in conventional algorithms employed for searching optimum routes. According to one example method of the invention, the travel time for a position for which travel time information is to be provided is determined in dependence on the road segment travel times, which are readily available, and an optical indicator for the travel time is displayed. Thereby, the travel time information may be readily conveyed to a user without requiring substantial additional computational power or time. In particular, the method may be essentially based only on such information that is conventionally generated in optimum route searches.

The plurality of positions for which travel time information is to be provided may be selected in various ways and according to various criteria. In one example, the selecting of the plurality of positions comprises selecting the positions in dependence on predefined positions and/or in dependence on predefined times. In another example, the positions are selected in dependence on a user input. In this case, the user input may be continuously monitored and only a travel time information corresponding to a position presently specified by the user input may be displayed at a time. Due to the versatility with which the plurality of positions may be selected, the method of the invention can be easily adapted to various user preferences. Further, since travel time information is conventionally not displayed for, e.g., all road segment end points, but only for specific selected positions, the electronic map may avoid becoming cramped with additional travel time information and may still be conveniently read.

The method is equally applicable to cases in which a specific travel route from the start point to a destination is planned, and to cases in which no specific route is selected. In one example, travel times are displayed for a specific route from the start point to a destination. In this case, the plurality of positions for which travel times are displayed is located on the route, and the road segments for which road segment travel times are determined are the road segments of the route. The road segment travel times may, in this case, for example, reflect the total travel time from the start point to the start point of the respective road segment, the end point of the respective road segment, or any other suitably defined point on the respective road segment. In the step of determining a travel time for a position, the travel time of the position may be set equal to the road segment travel time of the road segment that is in proximity to the position, typically the road segment on which the position is located, or one of the neighboring road segments. Alternatively, the step of determining a travel time for a position may include an interpolation between road segment travel times of neighboring road segments. In particular, the interpolation may be a linear interpolation. In this manner, the travel time for a position for which the travel time is to be displayed may be readily determined, either by setting the travel time equal to one of the road segment travel times or by a simple interpolation.

In another example, the method of the invention may be applied to a case in which no active route from the start point to a destination is selected. Rather, the plurality of positions is located in an area which at least partially surrounds the start point, and the optical indicators are formed by a line or a surface pattern on the electronic map that is indicative of a region that can be reached within a given travel time. In this manner, information is conveyed to the user that allows the user to readily determine which destinations may be reached within a given time. To compute the line or the surface pattern indicative of the region that can be reached within a given travel time, a tiling may be defined that covers the area, and for each tile of the tiling, a road segment located in the tile and having maximum travel speed within the tile or maximum rank within the tile is selected. For this road segment, the road segment travel time is determined. In this manner, the line or surface pattern may be determined with only moderate computational requirements. Optical indicators may also be displayed on the electronic map in proximity to the respective position of the plurality of positions. This allows the user to easily associate the optical indicator with the respective position.

The system may be easily configured for dynamical route determination. For example, the system may include receiving a traffic message channel (TMC)-signal and adapting the plurality of road segment travel times in dependence on the TMC-signal. In this case, the travel times for the plurality of positions are re-determined and the optical indicators are re-displayed, thereby updating the electronic map in accordance with the received TMC-signal. Further, the system may also including determining a current vehicle position and a current time and updating the optical indicators in dependence on the current vehicle position and the current time. If the vehicle is traveling on a route from the start point to the destination, the optical indicators displayed on the electronic map may thereby be updated according to the actual travel progress.

Such a system may be a navigation system aboard a vehicle, or other mapping device. In the case of the navigation system, the electronic map is displayed by an optical output unit of the navigation system. The system may be configured in such a manner that the positions for which travel time information is to be displayed may be selected in various ways. For example, the storage unit of the system may store predefined positions and the processor unit may select at least one of the plurality of positions in dependence on the predefined positions, and/or the processor unit may select at least one of the plurality of positions by comparing the road segment travel times to predefined times.

Alternatively or additionally, the system may include an input unit coupled to the processor unit for receiving a user input, where the processor unit selects at least one position of the plurality of positions in dependence on the user input. Further, the system may be configured to display the travel time information for the plurality of positions both for the case that an active route from the start point to a destination has been selected, and for the case that there is no active route. In the former case, the processor unit determines the plurality of road segment travel times for a set of road segments located on the route connecting the start point and the destination and selects the plurality of positions to be located on the route. In the latter case, the processor unit selects the plurality of positions so that it is located in an area at least partially surrounding the start point, where the optical indicators form a line or a surface pattern on the electronic map indicative of a region that can be reached within a given travel time. The processor unit may further be configured to perform a shortest or a fastest route search to determine the plurality of road segment travel times.

The display unit may further be configured in such a way that, for each position of the plurality of positions, the optical indicator is displayed on the electronic map in proximity to the respective position, allowing the user to readily identify the travel time information with the respective position. Further, the system may include a TMC-receiver and/or a GPS-receiver coupled to the processor for receiving a TMC-signal or for determining a current vehicle position, respectively, where the processor unit and the display unit are configured in such a way that the optical indicators are updated in dependence on the signal received by the TMC-receiver or the current vehicle position determined by the GPS-receiver, respectively.

While the methods and devices according to the various implementations of the invention are expected to be particularly useful for navigation systems installed in vehicles, the methods and devices are not limited to this specific field of application. Rather, the methods and devices according to the various implementations may be advantageously employed in any system that provides an electronic map to a user.

The foregoing description of implementations has been presented for purposes of illustration and description. It is not exhaustive and does not limit the claimed inventions to the precise form disclosed. Modifications and variations are possible in light of the above description or may be acquired from practicing the invention. For example, persons skilled in the art will understand and appreciate, that one or more processes, sub-processes, or process steps described in connection with FIGS. 1-10 may be performed by hardware and/or software. Additionally, a travel time information system, as described above, may be implemented in software that would be executed within a processor or plurality of processor in a networked environment. Examples of a processor include but are not limited to microprocessor, general purpose processor, combination of processors, DSP, any logic or decision processing unit regardless of method of operation, instructions execution/system/apparatus/device and/or ASIC. If the process is performed by software, the software may reside in software memory, e.g., the storage unit 104, in the device used to execute the software. The software in software memory may include an ordered listing of executable instructions for implementing logical functions, i.e., "logic" that may be implemented either in digital form such as digital circuitry or source code or optical circuitry or chemical or biochemical in analog form such as analog circuitry or an analog source such an analog electrical, sound or video signal, and may selectively be embodied in any signal-bearing (such as a machine-readable and/or computer-readable) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "machine-readable medium," "computer-readable medium," and/or "signal-bearing medium" (hereinafter, "signal-bearing medium") is any means that may contain, store, communicate, propagate, or transport the program for use by or in connection with the instruction execution system, apparatus, or device. The signal-bearing medium may selectively be, for example but not limited to, an electronic, magnetic, optical, electromagnetic, infrared, or semiconductor system, apparatus, device, air, water, or propagation medium. More specific examples, but nonetheless a non-exhaustive list, of computer-readable media would include the following: an electrical connection (electronic) having one or more wires; a portable computer diskette (magnetic); a RAM (electronic); a read-only memory "ROM" (electronic); an erasable programmable read-only memory (EPROM or Flash memory) (electronic); an optical fiber (optical); and a portable compact disc read-only memory "CDROM" "DVD" (optical). Note that the computer-readable medium may even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. Additionally, it is appreciated by those skilled in the art that a signal-bearing medium may include carrier wave signals on propagated signals in telecommunication and/or network distributed systems. These propagated signals may be computer, i.e., machine data signals embodied in the carrier wave signal. The computer/machine data signals may include data or software that is transported or interacts with the carrier wave signal. Note also that the implementation may vary between systems. The claims and their equivalents define the scope of the invention.

What is claimed is:

1. A method of providing travel time information for a plurality of positions on an electronic map comprising the steps of:
   providing map data containing information on road segments;
   determining a plurality of road segment travel times based on the map data, where a road segment travel time for a road segment corresponds to a travel time from a start point to a point on the road segment;
   selecting a plurality of positions for which travel time information is to be provided based upon comparing the road segment travel times to one or more pre-defined times, where the plurality of the positions are located in an area at least partially surrounding the start point;
   defining a tiling covering the area, where for each tile of the tiling, a road segment travel time is respectively determining for a road segment located in the tile and having maximum travel speed in the tile; and
   displaying an optical indicator for the respective travel time information for each of the plurality of positions on the electronic map, where the optical indicator includes an alphanumeric string representing an estimated arrival time and where the optical indicator comprises a line or a surface pattern on the electronic map indicative of a region that can be reached within a given travel time.

2. The method of claim 1, where the step of selecting further includes selecting the plurality of second positions in dependence on pre-defined positions, determining travel time information for each of the pre-defined positions and displaying an optical indicator for the respective travel time information on the electronic map for each pre-defined position.

3. The method of claim 1, where the step of selecting includes receiving a user input specifying at least one position of the plurality of positions.

4. The method of claim 3, where the method further comprises a step of monitoring the user input, where the steps of determining a travel time and displaying an optical indicator are repeated when the user input changes, thereby sequentially displaying the optical indicators for positions specified by the user input.

5. The method of claim 1, where the plurality of road segment travel times are determined for a set of road segments located on a route connecting the start point and a destination, where the plurality of positions is located on the route.

6. The method of claim 5, where in the step of determining a travel time for a position, the travel time of the position is set equal to the road segment travel time of the road segment in proximity to the position.

7. The method of claim 5, where the step of determining a travel time for a position includes the steps of determining first and second road segments located in proximity to the position and having first and second road segment travel times, and interpolating between the first and second road segment travel times.

8. The method of claim 1, where the plurality of road segment travel times are determined for a plurality of road segments which are automatically determined depending on the area.

9. The method of claim 1, where the plurality of road segment travel times are determined using a fastest route search.

10. The method of claim 1, where the plurality of road segment travel time are determined using a shortest route search.

11. The method of claim 1, where for each position of the plurality of positions, the optical indicator is displayed on the electronic map in proximity to the respective position.

12. The method of claim 1, where the method further comprises the step of receiving a TMC-signal and adapting the plurality of road segment travel times in dependence on the TMC-signal.

13. The method of claim 12, where the method further comprises the step of re-determining the travel times in dependence on the adapted plurality of road segment travel times and re-displaying optical indicators of the respective re-determined travel times on the electronic map.

14. The method of claim 1, where the method further comprises the steps of determining a current vehicle position and a current time, and updating the optical indicators in dependence on the current vehicle position and the current time.

15. The method of claim 1, where the electronic map is displayed by an optical output unit of a navigation system.

16. A device for providing travel time information for a plurality of positions on an electronic map, comprising:
a storage unit storing map data containing information on road segments;
a processor unit that determines a plurality of road segment travel times based on the map data, where a road segment travel time for a road segment corresponds to a travel time from a start point to a point on the road segment and where the plurality of positions are located in an area at least partially surrounding the start point;
the processor unit being further configured to select a plurality of positions for which travel time information is to be provided based upon comparing the road segment travel times to one or more pre-defined times and defined a tiling covering the area, where for each tile of the tiling, a road segment travel time is respectively determined for a road segment located in the tile and having maximum travel speed in the tile; and
a display unit coupled to the processor unit and configured to display an optical indicator for the travel time information of each of the plurality of positions on an electronic map, where the optical indicator includes an alphanumeric string representing an estimated arrival time and where the optical indicator comprises a line or a surface pattern on the electronic map indicative of a region that can be reached within a given travel time.

17. The device of claim 16, where the storage unit stores pre-defined positions and the processor unit selects at least one additional positions in dependence on the pre-defined positions.

18. The device of claim 16, where the device comprises an input unit coupled to the processor unit for receiving a user input, where the processor unit selects at least one position of the plurality of positions in dependence on the user input.

19. The device of claim 16, where the processor unit determines the plurality of road segment travel times for a set of road segments located on a route connecting the start point and a destination, and selects the plurality of positions on the route.

20. The device of claim 16, where the processor unit performs a fastest route search to determine the plurality of road segment travel times.

21. The device of claim 16, where the processor unit performs a shortest route search to determine the plurality of road segment travel times.

22. The device of claim 16, where the display unit is configured such that, for each position of the plurality of positions, the optical indicator is displayed on the electronic map in proximity to the respective position.

23. The device of claim 16, where the device further comprises a TMC-receiver coupled to the processor unit, where the processor unit adapts the plurality of road segment travel times in dependence on a signal received by the TMC-receiver.

24. The device of claim 16, where the device further comprises a GPS-receiver coupled to the processor unit for determining a current vehicle position, where the processor unit re-determines the travel times for the plurality of positions in dependence on the current vehicle position and a current time.

* * * * *

UNITED STATES PATENT AND TRADEMARK OFFICE
CERTIFICATE OF CORRECTION

PATENT NO. : 8,355,865 B2  
APPLICATION NO. : 11/939474  
DATED : January 15, 2013  
INVENTOR(S) : Thomas Wagner et al.

Page 1 of 1

It is certified that error appears in the above-identified patent and that said Letters Patent is hereby corrected as shown below:

Column 12  
Line 36, please delete "determining" and insert -- determined --

Column 14  
Line 1, please delete "defined" and insert -- define --

Column 14  
Line 16, please delete "positions" and insert -- position --

Signed and Sealed this  
Twenty-sixth Day of February, 2013

Teresa Stanek Rea  
*Acting Director of the United States Patent and Trademark Office*